(12) United States Patent
Weng et al.

(10) Patent No.: US 12,145,758 B1
(45) Date of Patent: Nov. 19, 2024

(54) HOUSEHOLD VACUUM SEALER (71) Applicant: Bigland Electric Appliance Co., Ltd., Dongguan (CN)

(72) Inventors: Guangbin Weng, Dongguan (CN); Xinzhai Zheng, Dongguan (CN); Jiongxian Chen, Dongguan (CN); Shangzhi Yu, Dongguan (CN); Shangwei Yu, Dongguan (CN)

(73) Assignee: Bigland Electric Appliance Co., Ltd., Dongguan (CN)

( * ) Notice: Subject to any disclaimer, the term of this patent is extended or adjusted under 35 U.S.C. 154(b) by 0 days.

(21) Appl. No.: 18/731,989

(22) Filed: Jun. 3, 2024

(51) Int. Cl.
*B65B 31/04* (2006.01)
*B29C 65/22* (2006.01)
*B65B 51/14* (2006.01)
*B65B 61/06* (2006.01)

(52) U.S. Cl.
CPC ............ *B65B 31/048* (2013.01); *B29C 65/22* (2013.01); *B29C 65/228* (2013.01); *B65B 51/146* (2013.01); *B65B 61/06* (2013.01)

(58) Field of Classification Search
CPC ..... B65B 31/048; B65B 51/146; B65B 61/06; B29C 65/223
See application file for complete search history.

(56) References Cited

U.S. PATENT DOCUMENTS

| | | | | |
|---|---|---|---|---|
| 2,838,894 A | * | 6/1958 | Paikens | B65B 31/06 53/512 |
| 3,262,833 A | * | 7/1966 | Zelnick | B29C 65/7441 53/550 |
| 4,021,290 A | * | 5/1977 | Smith | B65B 51/148 156/583.9 |
| 5,352,323 A | * | 10/1994 | Chi | B65B 51/146 156/583.8 |
| 6,256,968 B1 | * | 7/2001 | Kristen | F04B 49/022 53/512 |
| 6,467,242 B1 | * | 10/2002 | Huang | B65B 31/06 53/512 |
| 7,231,753 B2 | * | 6/2007 | Patterson | B65B 31/06 53/512 |
| 9,764,868 B2 | * | 9/2017 | Hu | B65B 51/146 |
| 11,174,088 B2 | * | 11/2021 | Michie | B65D 53/06 |
| 11,772,333 B2 | * | 10/2023 | Lank | B29C 66/91421 53/452 |
| 2002/0043050 A1 | * | 4/2002 | Costello | B65B 51/146 53/512 |

(Continued)

*Primary Examiner* — Robert F Long
*Assistant Examiner* — Eduardo R Ferrero
(74) *Attorney, Agent, or Firm* — Justin Lampel (57) ABSTRACT

A household vacuum sealer provided by the present invention contains: a holder and a cap. The holder includes a circuit board and an air pump, and the cap includes two hooks corresponding to two locking positions of the holder. The holder further includes a vacuuming portion, a bag feeding portion, and a cutter platform. The cap includes a pumping portion, a first seal ring, a flexible strap, and a pumping orifice. The holder further includes a second seal ring. After the cap is locked on the holder, the first seal ring contacts with the second seal ring, and a closed space is defined between the vacuuming portion and the pumping portion so that a vacuuming pressure is equal to a pressure of the is equal to the pumping room, and a pressure of the vacuum packaging bag is equal to a pressure of an isobaric pumping space.

4 Claims, 7 Drawing Sheets

(56) References Cited

U.S. PATENT DOCUMENTS

| | | | |
|---|---|---|---|
| 2005/0022472 A1* | 2/2005 | Brakes | B65B 31/046 53/434 |
| 2005/0022474 A1* | 2/2005 | Albritton | B29C 66/8324 53/512 |
| 2005/0022480 A1* | 2/2005 | Brakes | B65B 31/046 53/512 |
| 2005/0028488 A1* | 2/2005 | Higer | B65B 31/00 53/512 |
| 2005/0028494 A1* | 2/2005 | Higer | B65B 51/146 53/512 |
| 2005/0050855 A1* | 3/2005 | Baptista | B65B 31/046 53/512 |
| 2006/0053748 A1* | 3/2006 | Ahn | B65B 31/046 53/512 |
| 2006/0230711 A1* | 10/2006 | Higer | B65B 31/048 53/512 |
| 2006/0254219 A1* | 11/2006 | Alipour | B65D 81/2038 53/512 |
| 2007/0027012 A1* | 2/2007 | Abate | B65B 31/046 493/189 |
| 2008/0223005 A1* | 9/2008 | Kim | B65B 31/046 53/510 |
| 2011/0126986 A1* | 6/2011 | Cheung | B29C 66/861 156/350 |
| 2012/0060447 A1* | 3/2012 | Liu | B29C 66/861 53/370.7 |
| 2013/0097967 A1* | 4/2013 | Picozza | B65B 61/06 53/79 |
| 2013/0180210 A1* | 7/2013 | Hammad | B65B 41/12 53/88 |
| 2013/0232925 A1* | 9/2013 | Huang | B65B 51/146 53/510 |
| 2013/0340389 A1* | 12/2013 | Harder | B65B 57/08 383/105 |
| 2014/0010589 A1* | 1/2014 | Hu | B65B 65/00 403/322.4 |
| 2014/0041336 A1* | 2/2014 | Lee | B65B 31/048 53/52 |
| 2014/0090336 A1* | 4/2014 | Lee | B65B 31/02 53/79 |
| 2014/0102051 A1* | 4/2014 | Huang | B65B 31/048 53/512 |
| 2014/0109511 A1* | 4/2014 | Hammad | B65B 31/04 53/79 |
| 2014/0116003 A1* | 5/2014 | Hammad | B65B 7/06 53/376.3 |
| 2014/0196405 A1* | 7/2014 | Owens | B29C 66/43121 53/396 |
| 2014/0353203 A1* | 12/2014 | Hu | B65D 81/2023 206/524.8 |
| 2015/0027089 A1* | 1/2015 | Owens | B29C 66/861 53/167 |
| 2015/0052850 A1* | 2/2015 | Rausch | B65B 51/148 53/86 |
| 2015/0113915 A1* | 4/2015 | Kim | B65B 51/10 53/97 |
| 2015/0135641 A1* | 5/2015 | Hu | B65B 31/024 53/86 |
| 2015/0232210 A1* | 8/2015 | Sung | B29C 65/22 307/26 |
| 2015/0313400 A1* | 11/2015 | Hu | A47J 27/10 99/403 |
| 2015/0367973 A1* | 12/2015 | Owens | B65B 31/048 53/76 |
| 2016/0101885 A1* | 4/2016 | Ledger | B65B 31/00 53/110 |
| 2016/0137325 A1* | 5/2016 | Cannon, Jr. | B65D 81/2038 53/79 |
| 2016/0324196 A1* | 11/2016 | Bocks | B65B 31/024 |
| 2017/0043892 A1* | 2/2017 | Bocks | B29C 66/8324 |
| 2018/0079538 A1* | 3/2018 | Hu | B65B 31/048 |
| 2018/0079544 A1* | 3/2018 | Palese | B65B 61/20 |
| 2018/0118391 A1* | 5/2018 | Abate | A23L 3/3418 |
| 2018/0162569 A1* | 6/2018 | Day | B65B 25/001 |
| 2018/0184488 A1* | 6/2018 | Lee | B65B 51/148 |
| 2018/0251245 A1* | 9/2018 | Jung | B29C 66/8161 |
| 2018/0370669 A1* | 12/2018 | Xu | B29C 65/02 |
| 2019/0009941 A1* | 1/2019 | Schandel | B65B 61/025 |
| 2019/0055042 A1* | 2/2019 | Leppert | B65B 51/146 |
| 2019/0276217 A1* | 9/2019 | Michie | B65D 53/06 |
| 2020/0299013 A1* | 9/2020 | Ye | B29C 66/81821 |
| 2021/0016910 A1* | 1/2021 | Ye | B65B 31/00 |
| 2021/0031956 A1* | 2/2021 | Schandel | B65B 51/146 |
| 2021/0053711 A1* | 2/2021 | Kloeppel | B65B 51/32 |
| 2021/0179306 A1* | 6/2021 | Zhou | B65B 61/26 |
| 2021/0278125 A1* | 9/2021 | Wang | F25D 23/04 |
| 2021/0323708 A1* | 10/2021 | Owens | B65B 57/00 |
| 2021/0347508 A1* | 11/2021 | Li | B65B 51/148 |
| 2022/0134677 A1* | 5/2022 | Kahyaoglu | B29C 66/8324 53/479 |
| 2022/0144468 A1* | 5/2022 | Schandel | B29C 65/224 |
| 2022/0250779 A1* | 8/2022 | Li | B65B 51/10 |
| 2022/0380074 A1* | 12/2022 | Li | B65B 31/048 |
| 2022/0411118 A1* | 12/2022 | Park | B29C 66/1122 |
| 2023/0211909 A1* | 7/2023 | Tsujimoto | B65B 31/00 53/88 |

* cited by examiner

HOUSEHOLD VACUUM SEALER

TECHNICAL FIELD

The present disclosure relates to a vacuum sealer, and more particularly to a household vacuum sealer.

BACKGROUND

When a household vacuum sealer evacuates a vacuum packaging bag with fluids in the vacuum packaging bag, due to a pressure difference between the interior and exterior of the vacuum packaging bag, the fluids in the vacuum packaging bag will flow toward an opening of the vacuum packaging bag and flush into an air pumping groove of the household vacuum sealer. At present, the main solution is to fix a detection element inside the air pumping groove, and control the household vacuum sealer to stop pumping when the fluids are detected in the air pumping groove. However, to obtain better preservation effect, the household vacuum sealer is required to pump the air inside the vacuum packaging bag, thus causing the fluids to flow to the opening and overflowing the opening.

The present invention has arisen to mitigate and/or obviate the afore-described disadvantages.

SUMMARY

A primary aspect of the present invention is to provide a household vacuum sealer which is capable of avoiding a leakage of the fluids out of the opening of the vacuum packaging bag in an vacuuming operation of the household vacuum sealer.

To obtain above-mentioned aspect, a household vacuum sealer provided by the present invention contains: a holder and a cap, a rear side of the cap is rotatably connected on a top of the holder, the holder includes a circuit board and an air pump which are accommodated in a cavity of the holder, the circuit board includes a control circuit configured to control the household vacuum sealer, and the circuit board is electrically connected with the air pump, and the cap includes two hooks extending from two sides of a bottom of the cap, and the holder includes two locking positions defined on two sides of the top of the holder and corresponding to the two hooks, thus locking the cap on the top of the holder.

The holder includes a vacuuming portion formed on a front portion of the top thereof, the vacuuming portion is tilted, a front end of the vacuuming portion is lower than a rear end of the vacuuming portion, and the holder includes a bag feeding portion mounted on a rear portion of the top thereof, the bag feeding portion has a supply cavity defined therein to accommodate a vacuum packaging bag, and a cutter platform formed on a front end of the supply cavity and extending to the vacuuming portion, and two sides of the vacuuming portion extend to the two locking positions.

The cap includes a pumping portion formed on a bottom thereof, a first seal ring fixed on the bottom of the cap and surrounding the pumping portion, and a flexible strap and a pumping orifice which are arranged on an interior of the pumping portion, an exterior of the pumping orifice is connected with an air pump via an air tube, and the pumping orifice flushes with the bottom of the cap.

The holder further includes a second seal ring mounted on the top thereof and surrounding the vacuuming portion, the vacuuming portion has a storage tank configured to pass the vacuum packaging bag, a heating element, and a discharge tank configured to receive an opening of the vacuum packaging bag. The storage tank, the heating element, and the discharge tank are obliquely accommodated in the vacuuming portion, and a width of the storage tank obliquely along the vacuuming portion is 0.4-0.6 times of a total width of the vacuuming portion.

A top of the heating element extends out of the top of the vacuuming portion, after the cap is locked on the holder, a bottom of the flexible strap abuts against the top of the heating element.

After the cap is locked on the holder, the first seal ring contacts with the second seal ring, and a closed space is defined between the vacuuming portion and the pumping portion so that a vacuuming pressure is equal to a pressure of the is equal to the pumping room, and a pressure of the vacuum packaging bag is equal to a pressure of an isobaric pumping space.

Other objects and features will be in part apparent and in part pointed out hereinafter.

DETAILED DESCRIPTION

With reference to FIGS. 1-7, a household vacuum sealer according to a preferred embodiment of the present invention comprises: a holder 1 and a cap 2, wherein a rear side of the cap 2 is rotatably connected on a top of the holder 1, the holder 1 includes a circuit board 3 and an air pump 4 which are accommodated in a cavity of the holder 1, wherein the circuit board 3 includes a control circuit configured to control the household vacuum sealer, and the circuit board 3 is electrically connected with the air pump 4, the cap 2 includes two hooks 21 extending from two sides of a bottom thereof, and the holder 1 includes two locking positions 11 defined on two sides of the top thereof and corresponding to the two hooks 21, thus locking the cap 2 on the top of the holder 1.

Figure 1:
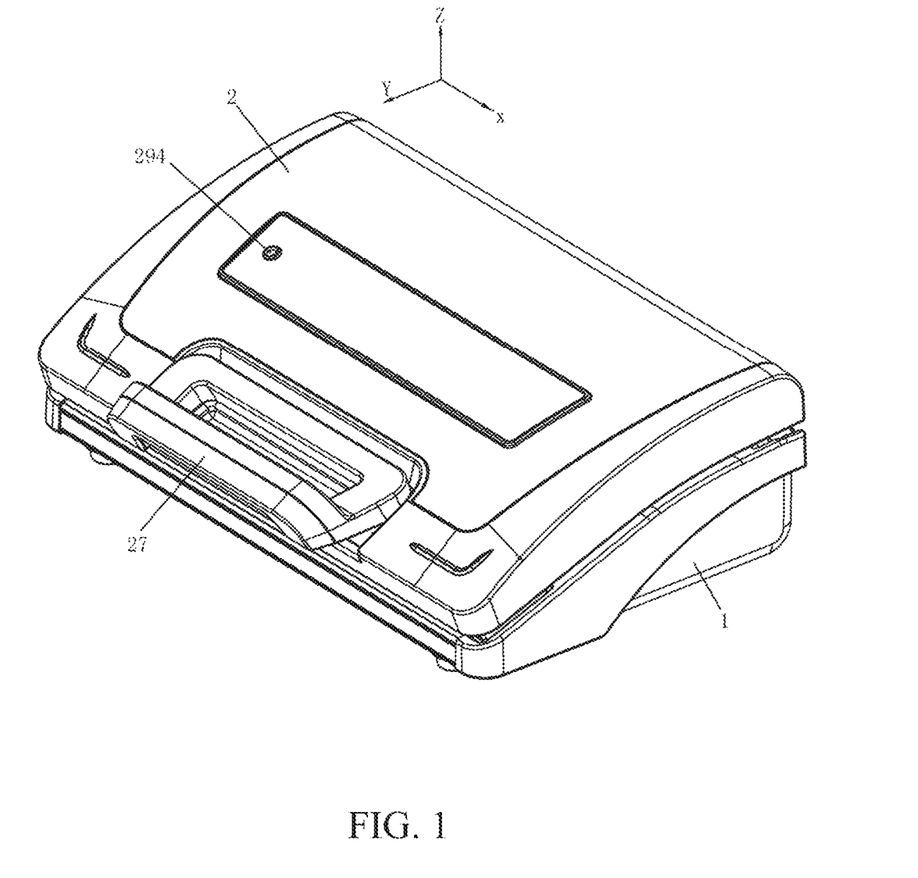
FIG. 1 is a perspective view showing the assembly of a household vacuum sealer according to a preferred embodiment of the present invention.
Figure 2:
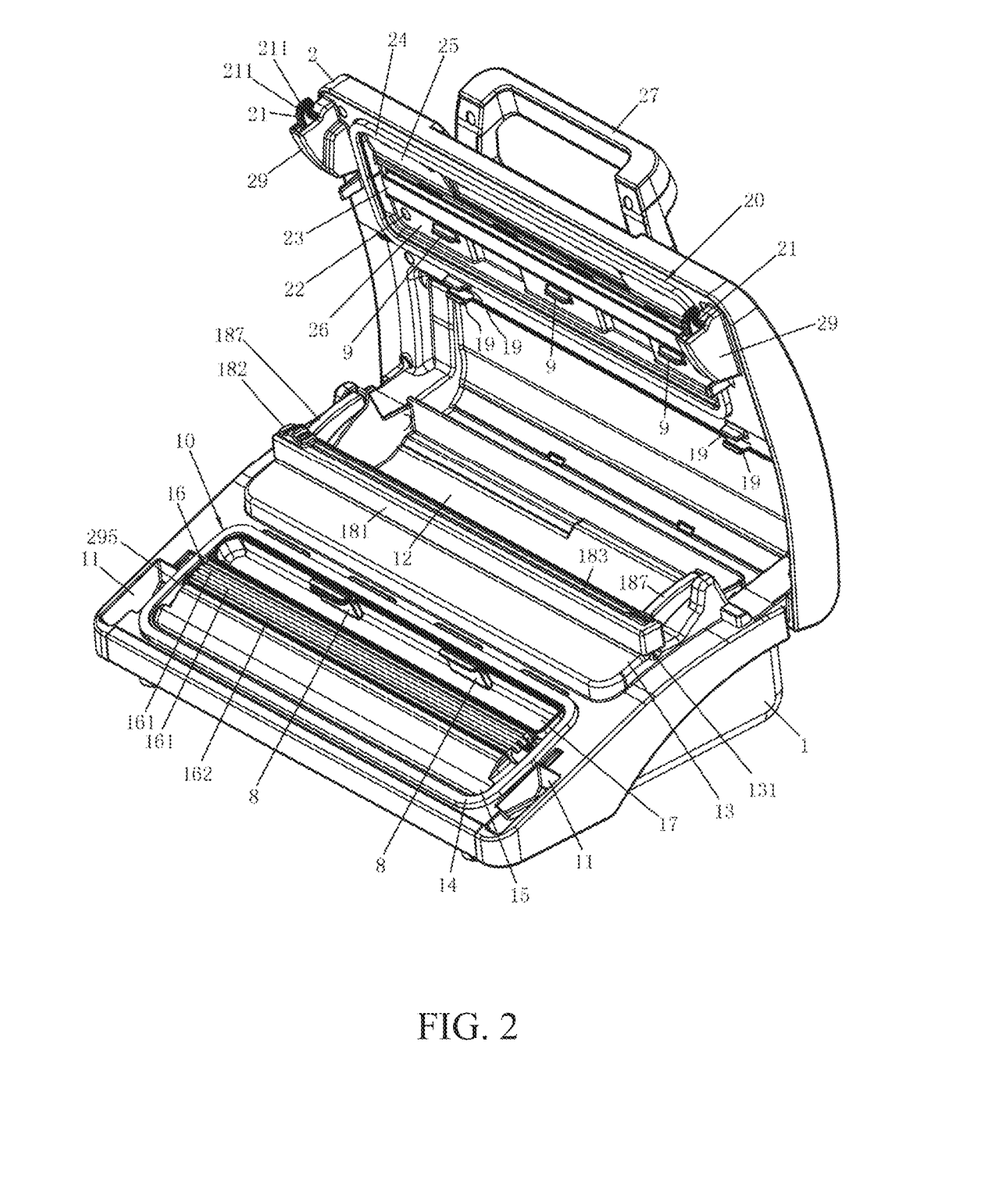
FIG. 2 is a perspective view showing the operation of the household vacuum sealer according to the preferred embodiment of the present invention.
Figure 3:
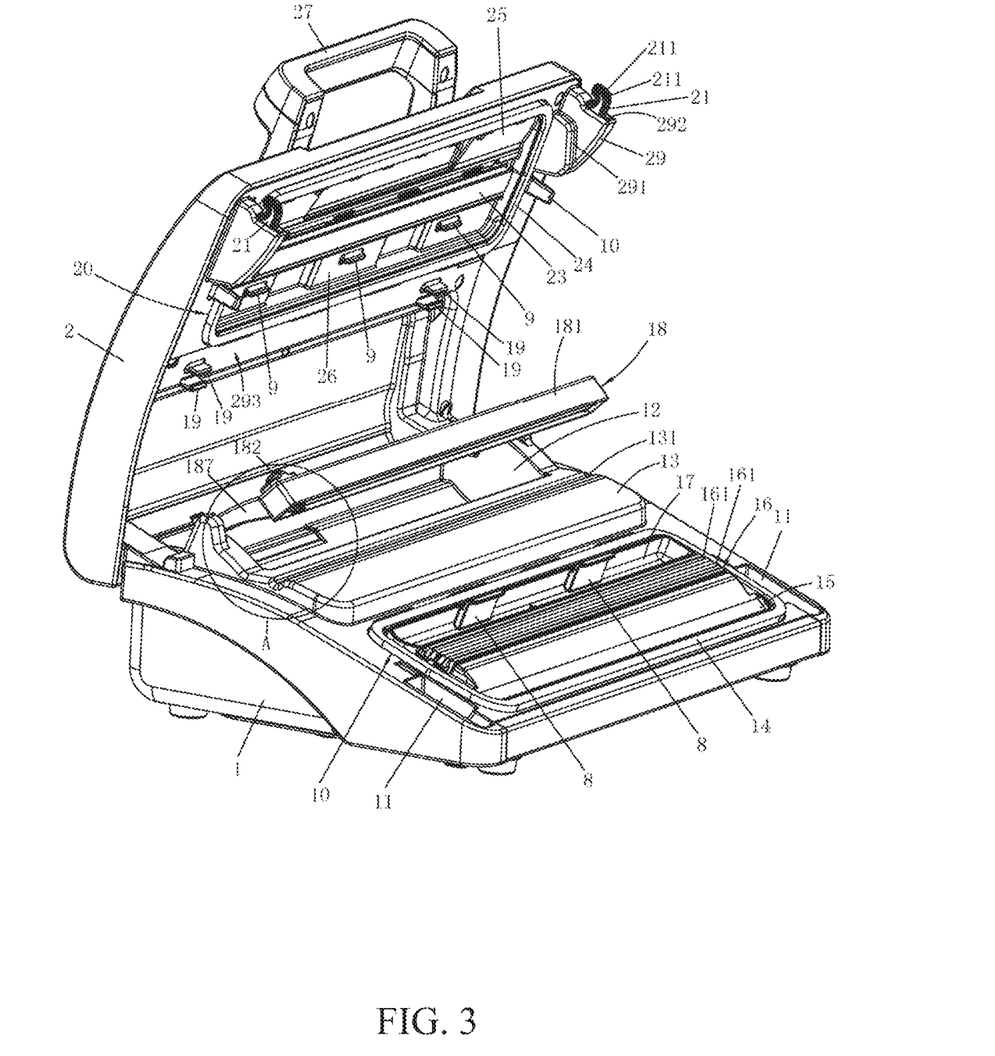
FIG. 3 is another perspective view showing the operation of the household vacuum sealer according to the preferred embodiment of the present invention.
Figure 4:
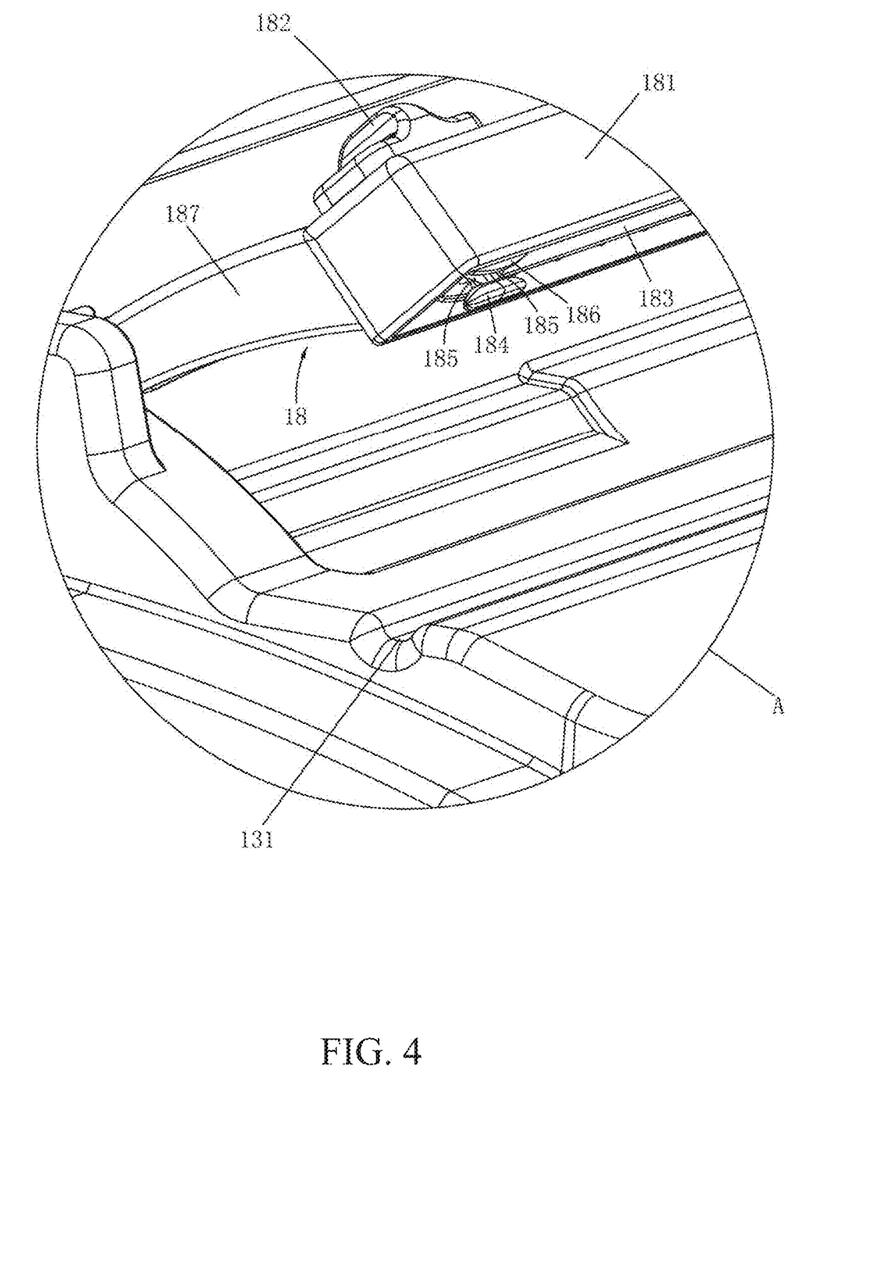
FIG. 4 is an amplified perspective view showing of a portion A of FIG. 3.
Figure 5:
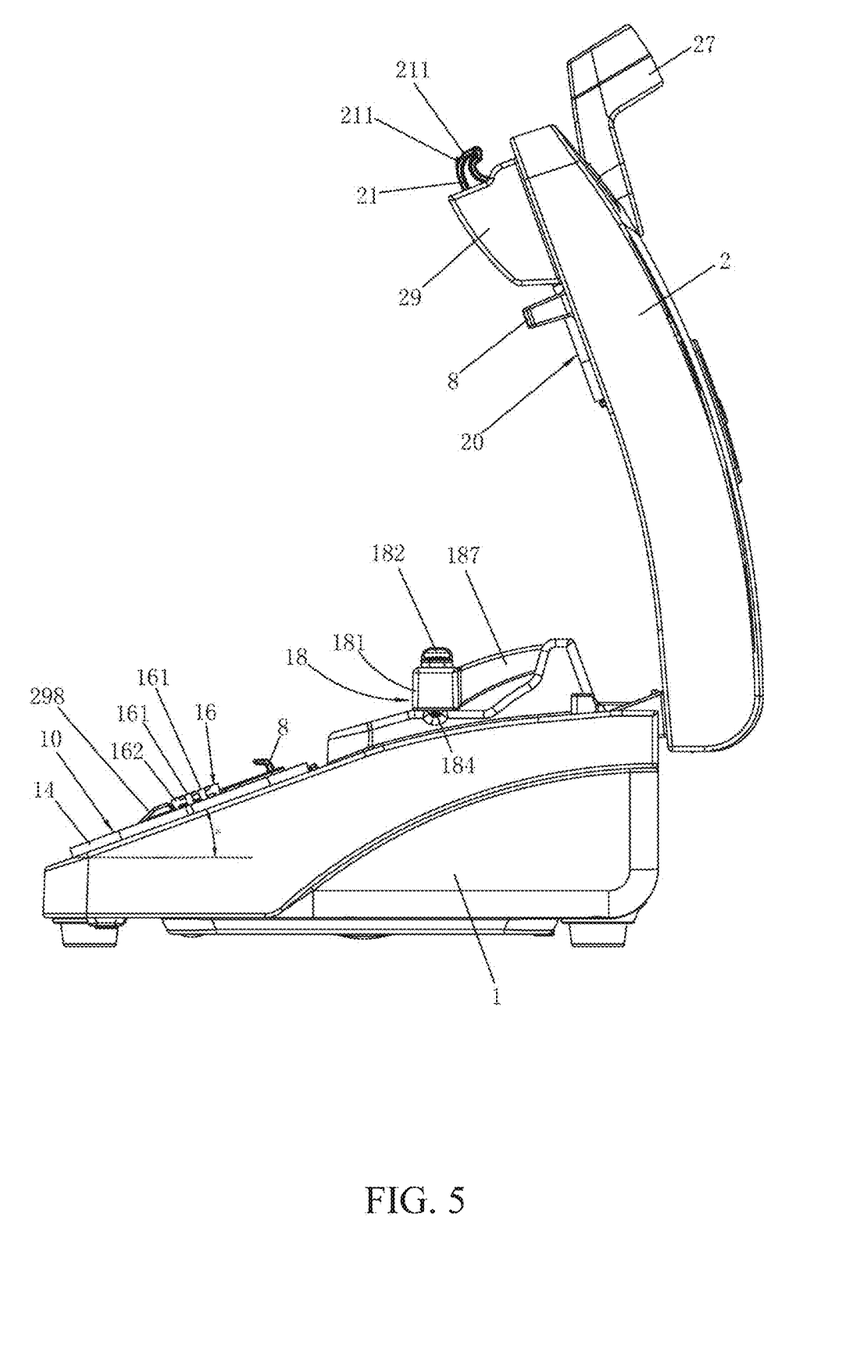
FIG. 5 is a side plan view showing the operation of the household vacuum sealer according to the preferred embodiment of the present invention.

As shown in FIG. 1, an X axis is defined and extends horizontally, a Z axis extends vertically, wherein a front end of the household vacuum sealer is defined as facing a user, for example, a side of a handle 27 is defined as the front end of the household vacuum sealer.

Figure 7:
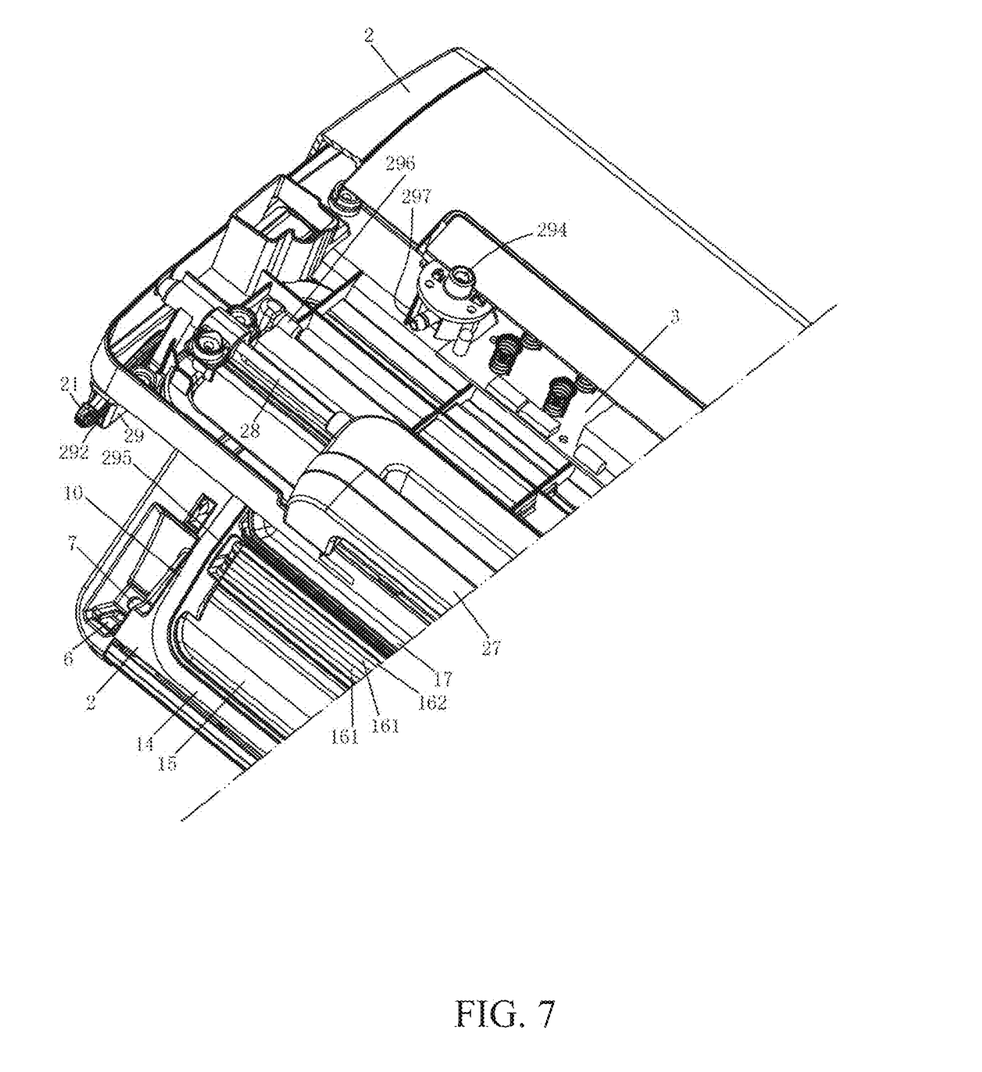
FIG. 7 is a perspective view showing the assembly of a part of the household vacuum sealer according to the preferred embodiment of the present invention.

The cap 2 includes the handle 27 rotatably connected on a top thereof and extending out of a front end of the cap 2, a rotary shaft 28 rotatably fixed in a cavity of the cap 2, wherein a rear end of the handle 27 is fixed on a middle portion of the rotary shaft 28, and two sides of the rotary shaft 28 extend to the two hooks 21, wherein two rear ends of the two hooks 21 are mounted on the rotary shaft 28, as shown in FIG. 7, the cap 2 further includes two sleeves 29 one-piece formed on two sides of a bottom thereof, and the two sleeves 29 have two fixing portions 291 one-piece formed on two inner walls thereof, wherein a height of a front end of a respective one fixing portion 291 of the two fixing portions 291 is smaller than a height of a rear end of the respective one fixing portion 291, and two arcuate corners are formed on the front end and the rear end of the respective one fixing portion 291. The two locking positions 11 are one-piece formed on the holder 1, and the two locking positions 11 have two main receiving chambers defined on two outer walls thereof to accommodate the two sleeves 29, and two auxiliary receiving chambers defined on two inner walls thereof to correspond to the two fixing portions 291 so that after the two sleeves 29 are forced into the two locking positions 11, the two fixing portions 291 abut against the two auxiliary receiving chambers. The two sleeves 29 have two windows 292 formed on two front ends thereof, wherein a respective one sleeve 29 of the two sleeves 29 has a respective one hook 21 of the two hooks 21, wherein the handle 27 is configured to drive the rotary shaft 28 to rotate easily, and the rotary shaft 28 actuates the respective one hook 21 to rotate simultaneously so that a front end of the respective one hook 21 extends out of a respective one window 292 of the two windows. The two hooks 21 have two C-shaped extensions extending outward therefrom, two anti-slip blocks 211 separately formed on two outer walls of the two C-shaped extensions. The two main receiving chambers of the two locking positions 11 have two locking orifices 6 defined on two front ends thereof so that after the two hooks 21 rotate, the two C-shaped extensions rotatably insert into the two locking orifices 6, the two anti-slip blocks 211 of the two C-shaped extensions abut against two bottoms of the two main receiving chambers of the two locking positions 11 to avoid a backward removal of the two hooks 21 and a removal of the cap 2 when the household vacuum sealer operates. After pulling the handle 27, the handle 27 actuates the rotary shaft 28 to rotate reversely, and the two hooks 21 are driven by the rotary shaft 28 to revolve reversely so that the two C-shaped extensions remove from the two locking orifices 6, hence the cap is opened and closed easily by using the handle 27. The two locking position 11 have two discharge orifices 7 defined on two bottoms thereof and configured to discharge fluids outward after the fluids flow into the two locking positions 11.

The holder 1 includes a vacuuming portion 10 formed on a front portion of the top thereof, wherein the vacuuming portion 10 is tilted, for example, a front end of the vacuuming portion 10 is lower than a rear end of the vacuuming portion 10, and the holder 1 includes a bag feeding portion mounted on a rear portion of the top thereof, wherein the bag feeding portion has a supply cavity 12 defined therein to accommodate a vacuum packaging bag, and a cutter platform 13 formed on a front end of the supply cavity 12 and extending to the vacuuming portion 10, wherein two sides of the vacuuming portion 10 extend to the two locking positions 11.

The cap 2 includes a pumping portion 20 formed on a bottom thereof, a first seal ring 24 fixed on the bottom of the cap 2 and surrounding the pumping portion 20, a flexible strap 23, a pumping orifice 22, an accommodation room 25, and a pressing portion 26 which are arranged on an interior of the pumping portion 20. A bottom of the flexible strap 23 extends out of the bottom of the cap 2, the pumping orifice 22 is defined on a predetermined position of the interior of the pumping portion 20 and has an interface 192 formed on an outer wall thereof, wherein the interface 196 is connected with an air pump 4 via an air tube, the pumping orifice 22 flushes with the bottom of the cap 2, as shown in FIG. 7, and the cap 2 further includes a receiving room 293 defined in the bottom thereof and configured to accommodate a pump element, wherein the pump element has a drawing tube and a connector connected on an end of the drawing tube, the receiving room 293 has two clampers 19 fixed on two sides thereof and configured to engage with the two sides of the drawing tube. The cap 2 further includes a socket 294 defined on the top thereof and configured to connect with an exhaust joint which is removed from the receiving room 293, wherein a top of the socket 294 exposes outside the top of the cap 2, and the cap 2 accommodates a control valve which is electrically connected with the circuit board 3, the socket 294 has an interface 297 formed on an inner wall thereof and connected with the control valve via am air tube, the control valve is connected with the air pump 4 and configured to pump airs solely.

The holder 1 further includes a second seal ring 14 mounted on the top thereof and surrounding the vacuuming portion 10, the vacuuming portion 10 has a storage tank 15 configured to pass a body of the vacuum packaging bag 5, a heating element 16, and a discharge tank 17 configured to receive an opening of the vacuum packaging bag 5, wherein the storage tank 15, the heating element 16, and the discharge tank 17 are oblique accommodated in the vacuuming portion 10. After the cap 2 is locked on the holder 1, the accommodation room 25 and the storage tank 15 are defined a first storing room which is tilted and elongated, and the discharge tank 17 and the pressing portion 26 are defined a second storing room, wherein a height of an interior of a lower portion of the second storing room is greater than a height of an interior of an upper portion of the second storing room to enhance a height of the discharge tank 17 and the opening of the vacuum packaging bag 5 relative to a height of the bottom of the holder 1, hence the fluids in the vacuum packaging bag 5 does not discharge into the discharge tank 17. A top of the storage tank 15 is widen so that when the fluids discharge to the second storing room and are over the discharge tank 17, the fluids flows into the first storing room, wherein a width of the storage tank 15 obliquely along the vacuuming portion 10 is 0.4-0.6 times of a total width of the vacuuming portion 10, for example, the width of the storage tank 15 obliquely along the vacuuming portion 10 is 0.5 times of the total width of the vacuuming portion 1 to increase a size of the first storing room, thus accommodating more fluids. Thereby, a size of the household vacuum sealer to accommodate the fluids is increased 3 times than conventional household vacuum sealer. In vacuuming operation of the household vacuum sealer, the air pump 4 is set to operate in a predetermined time and is stopped, for example, the air pump 4 pumps airs for 5 to 10 seconds a vacuuming operation and stops pumping the airs. Accordingly, when the fluids discharge out of the vacuum packaging bag in the vacuuming operation, the fluids are accommodated in the household vacuum sealer and do not reach to the top of the second storing room after the air pump stops. In other words, the fluids do not reach to the pumping orifice 22 to pollute the air tube, flow into the cap 2 or the holder, thus protecting related components (such as the air tube, the air pump 4, and the circuit board 3) of the household vacuum sealer to enhance using safety.

To enhance the using safety of the household vacuum sealer and avoid an overflow of the fluids in the vacuuming operation, the household vacuum sealer has following advantages features.

A top of the heating element 16 extends out of the top of the vacuuming portion 10, after the cap 2 is locked on the holder 1, a bottom of the flexible strap 23 abuts against the top of the heating element 16. At least one first conduit 295 is defined among two sides of the flexible strap 23 and the first seal ring 24, and at least one second conduit 295 is defined among two sides of the heating element 16 and the second seal ring 14, after the cap 2 is locked on the holder 1, the two sides of the second storing room communicate with the two sides of the first storing room. After the cap 2 is locked on the holder 1, the first seal ring 24 contacts with the second seal ring 14, and a closed space is defined between the vacuuming portion 10 and the pumping portion 20 so that a vacuuming pressure is equal to a pressure of the is equal to the pumping room, and a pressure of the vacuum packaging bag 5 is equal to a pressure of an isobaric pumping space.

Figure 6:
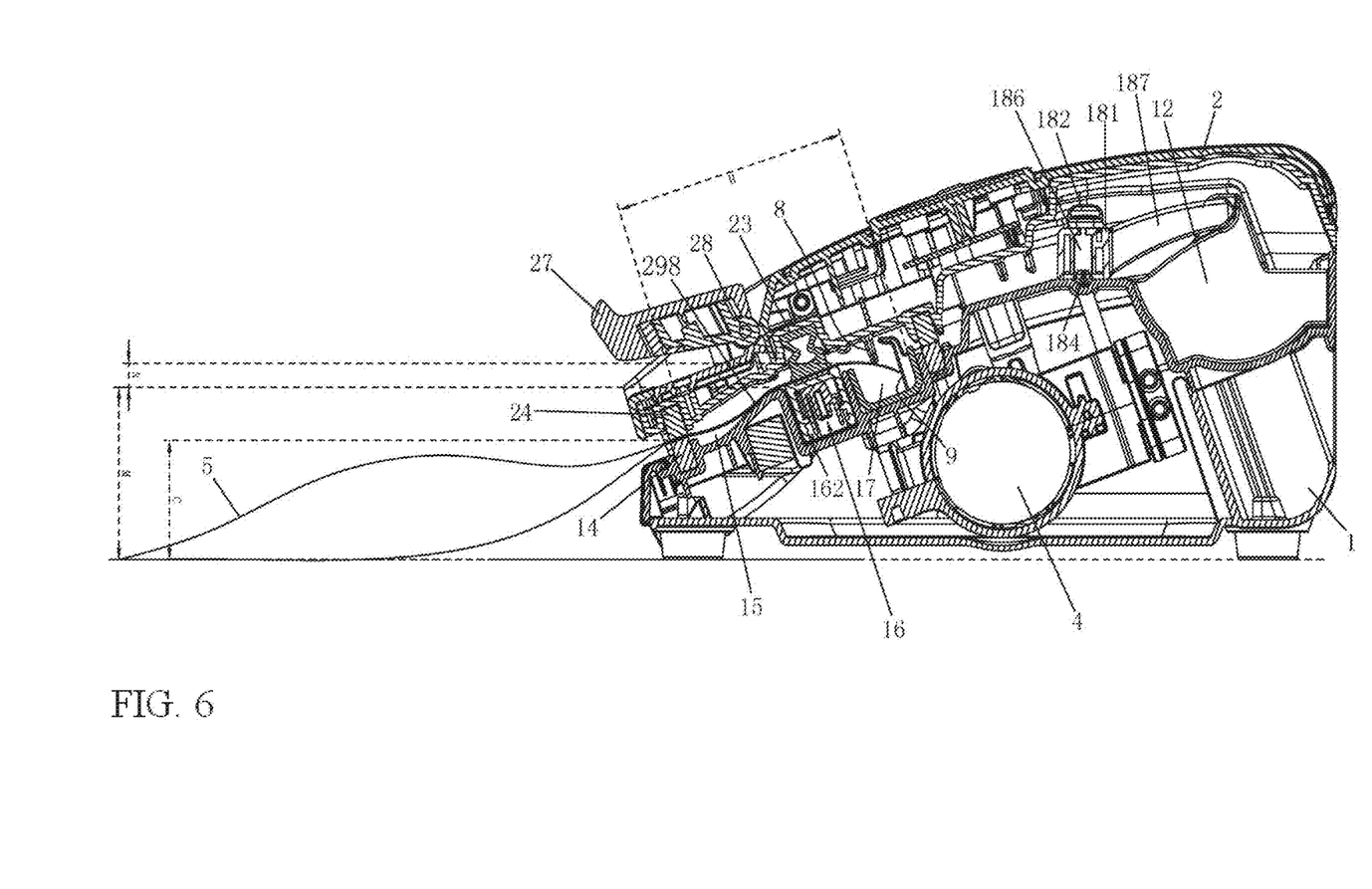
FIG. 6 is a cross sectional view showing the assembly of the household vacuum sealer according to the preferred embodiment of the present invention.

The isobaric pumping space is tilted and elongated, a height difference M is defined between a top of the discharge tank 17 and the bottom of the holder 1, wherein the height difference M is more than 5 cm, a lowest point of the top of the discharge tank 17 is height than a highest point of the top of the storage tank 15, and a height difference N is defined between the lowest point of the top of the discharge tank 17 and the highest point of the top of the storage tank 15, wherein the height difference N is more than 1 cm. A height of an outer end of the opening is raised to 30 to 40% more than the total height of the household vacuum sealer. The height of the opening of the conventional household vacuum sealer is C. In the present invention, the height of the opening is relatively increased by a height difference (M+N-C) accounts for about 30 to 40% of the total height of the conventional household vacuum sealer, thus preventing the fluid from overflowing the opening, as shown in FIG. 6, a width of the storage tank 15 is 2 to 3 times wider than a width of the discharge tank 17, a size of the first storing room is at least two times more than a size of the second storing room, hence the width of a top of the vacuuming portion 10 is 0.4 to 0.5 times more than the total width of the top of the holder 1, thus increasing the size of the first storing room.

Due to an atmospheric pressure, after the vacuum sealer evacuates the airs from the opening, the external pressure of the vacuum packaging bag kept outside the vacuum sealer is greater than the pressure inside the vacuum packaging bag. After the pressure difference is large enough and maintained for a set time, the pressure inside the vacuum packaging bag will force the fluids to flow upward and enter an isobaric pumping space.

Thereby, the size of the isobaric pumping space is increased to maintain the same pressure between exterior and interior of the vacuum packaging bag in the isobaric pumping space, hence the fluids in the vacuum packaging bag does not flow out of the vacuum packaging bag. A width of the top of the storage tank 15 obliquely along the vacuuming portion 10 is 6 to 10 cm, and a width of the storage tank 15 obliquely along the vacuuming portion 10 is 6 to 10 cm, wherein a total length H of the vacuum packaging bag 5 in the isobaric pumping space is increased to 8 to 15 cm, the storage tank 15 includes a tilted guide face 298 defined on a rear portion thereof, wherein a front end of the tilted guide face 298 is lower than a rear end of the tilted guide face 298, a top of the rear end of the tilted guide face 298 flushes with a top of the heating element 16, and a front end of the isobaric pumping space is lower than a rear end of the isobaric pumping space, hence a resistance of the fluids flowing through the heating element 16 is increased to maintain a buffer space to stop the fluids in the vacuum packaging bag by using a total length H of the vacuum packaging bag, and the fluids are stopped on the front end of the flexible strap 23 after flowing into the isobaric pumping space. A height of the opening of the vacuum packaging bag relative to the vacuum packaging bag extending out of the top of the heating element 16 is increased and is stopped by a gravity, hence when the fluids in the vacuum packaging bag flows close to the heating element 16, they are stopped with a larger resistance, the horizontal component of gravity of the fluids in the vacuum packaging bag is also a resistance that prevents the fluids from flowing toward the opening of the vacuum packaging bag, such that the fluids is difficult to flow over the heating element 16, thus avoiding the fluids discharging out of the vacuum packaging bag.

The flexible strap 23 has a cavity, a cross section of which is formed in a 8 shape, and a square silicone strip engaged in the flexible strap 23, wherein the flexible strap 23 has a receiving portion defined on a top thereof, two flexible fringes formed on two inner walls of the flexible strap 23, and the pressing portion 26 formed on a bottom of the flexible strap. Two tops of the two flexible fringes of the flexible strap 23 are connected with the receiving portion of the flexible strap 23, two bottoms of the two flexible fringe are connected with the pressing portion 26, and two middles of the two flexible fringes bend inward to the cavity of the flexible strap 23, wherein a thickness of a fixing portion is equal to a thickness of the two flexible fringes, a thickness of the pressing portion 26 is 2 to 3 times more than the thickness of the two flexible fringes, the pressing portion 26 has two wings extending from two sides of front and rear ends of the bottom thereof, wherein the bottom of the pressing portion 26 and two bottoms of the two wings are connected to form a plane to increase an area of the pressing portion to press the vacuum packaging bag. The cap 2 further includes a glue groove defined on the bottom thereof, and an installation portion is fixed on a bottom of the horizontal groove, wherein the two flexible fringes are received in the horizontal groove, the pressing portion 26 extends out of the bottom of the cap 2. Thus, the flexible strap 23 is widen to press the vacuum packaging bag matingly so as to force the fluids to flow to the opening of the vacuum packaging bag even a pressure difference is reduced. After the fluids flow to multiple pumping conducts of the vacuum packaging bag, the multiple pumping conduits are blocked, and the flexible strap 23 forces the opening to enhance a pressure of the exterior of the vacuum packaging bag, hence the pressure difference is decreased and the flexible strap 23 flexibly stop the fluids flowing out of the opening of the vacuum packaging bag.

The heating element 16 has an insulated seat 162 and two metal heating films 161, wherein a width of the two metal heating films are 3 to 5 mm, and the two metal heating films 161 are configured to melt the opening of the vacuum packaging bag to form two seal strips, wherein a width of the two seal strips is 3 to 5 mm, thus sealing the vacuum packaging securely. The insulated seat 162 has two electrodes fixed on a bottom thereof, the two metal heating films 161 are parallelly spaced and fixed on a top of the insulated seat 162, wherein two sides of a respective one metal heating film 161 of the two metal heating films 161 are winded to the bottom of the insulated seat 162 and the two electrodes of the insulated seat 162, wherein the circuit board 2 is electrically connected with the two electrodes of the insulated seat 162 to supply a power to the two metal heating films 161, such that the two metal heating films 161 heat. Furthermore, the respective one metal heating film 161 has an insulation cloth adhered on a top thereof.

The bag feeding portion includes a support rack 18 mounted on a top thereof, and the support rack 18 has a press bag mounting 181 and two rotary arms 187, two front ends of the two rotary arms 187 are disposed on two sides of the press bag mounting 181, and two rear ends of the two rotary arms 187 are rotatably connected on the bag feeding portion, wherein a bottom of the press bag mounting 181 has a pressing plane, and a bag cutter is a leverage structure by using the two rotary rams 187 so that the vacuum packaging bag is pressed easily and securely to avoid a removal when cutting the vacuum packaging bag.

The press bag mounting 181 has a slidable trench 183 defined on a top thereof and passing through the press bag mounting 181 and the pressing plane, wherein two sides of the slidable trench 183 extend to the two sides of the press bag mounting 181, and the slidable trench 183 slidably accommodates a slider 186, wherein the slider 186 has a push button 182 extending out of the top of the press bag mounting 181 from a top of the slider 186, a hook bag shuttle 184 extending out of the bottom of the press bag mounting 181 from the bottom of the slider 186, two cutters 185 clamped on a center of the slider 186, wherein two blades of the two cutters 185 face outward and are tiled relative to the hook bag shuttle 184, and the two blades of the two cutters 185 are mounted on the hook bag shuttle 184. The cutter platform 13 includes a cutting trough 131 one-piece formed therein, wherein two sides of the cutting trough 131 pass through the cutter platform 13, an arcuate surface is defined on a top of the cutting trough 131 and the cutter platform 13. After the press bag mounting 181 abuts against the cutter platform 13, the hook bag shuttle 184 is received in the cutting trough 131, and the push button 182 is pushed to drive the hook bag shuttle 184 to slide horizontally. Thereby, the hook bag shuttle 184 and the cutting trough 131 are mated to limit a cutting position of the vacuum packaging bag, thus cutting the vacuum packaging bag easily and smoothly.

The discharge tank 17 includes two stop plates 8 one-piece formed on an rear wall thereof and spaced apart, wherein three abutting plates 9 are arranged separately along the X axis, when the cap 2 is locked on the top of the holder 1, the two stop plates 8 are inserted among the three abutting plates 9, wherein a lowest point of the three abutting plates 9 is higher than a front end of the storage tank 15, the anti-rolling portion is behind the three abutting plates 9, and a highest point of the anti-rolling portion is more than three upper portions of the three abutting plates 9 so that when the vacuuming packaging bag is inserted into the discharge tank 17 smoothly, and the opening faces downward exactly and does not roll upward.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

We claim:

1. A household vacuum sealer comprising: a holder (1) and a cap (2), a rear side of the cap (2) being rotatably connected on a top of the holder (1), the holder (1) including a circuit board (3) and an air pump (4) which are accommodated in a cavity of the holder (1), the circuit board (3) including a control circuit configured to control the household vacuum sealer, and the circuit board (3) being electrically connected with the air pump (4), the cap (2) including two hooks (21) extending from two sides of a bottom of the cap (2), and the holder (1) including two locking positions (11) defined on two sides of the top of the holder (1) and corresponding to the two hooks (21), thus locking the cap (2) on the top of the holder (1);

wherein the holder (1) includes a vacuuming portion (10) formed on a front portion of the top thereof, wherein the vacuuming portion (10) is tilted, a front end of the vacuuming portion (10) is lower than a rear end of the vacuuming portion (10), and the holder (1) includes a bag feeding portion mounted on a rear portion of the top thereof, wherein the bag feeding portion has a supply cavity (12) defined therein to accommodate a vacuum packaging bag (5), and a cutter platform (13) formed on a front end of the supply cavity (12) and extending to the vacuuming portion (10), wherein two sides of the vacuuming portion (10) extend to the two locking positions (11);

wherein the cap (2) includes a pumping portion (20) formed on a bottom thereof, a first seal ring (24) fixed on the bottom of the cap (2) and surrounding the pumping portion (20), and a flexible strap (23) and a pumping orifice (22) which are arranged on an interior of the pumping portion (20), wherein an exterior of the pumping orifice (22) is connected with an air pump (4) via an air tube;

wherein the holder (1) further includes a second seal ring (14) mounted on the top thereof and surrounding the vacuuming portion (10), the vacuuming portion (10) has a storage tank (15) configured to allow passage of the vacuum packaging bag (5), a heating element (16), and a discharge tank (17) configured to receive an opening of the vacuum packaging bag (5), wherein the storage tank (15), the heating element (16), and the discharge tank (17) are obliquely accommodated in the vacuuming portion (10), wherein a top of the heating element (16) extends out of the top of the vacuuming portion (10), after the cap (2) is locked on the holder (1), a bottom of the flexible strap (23) abuts against the top of the heating element (16); and wherein after the cap (2) is locked on the holder (1), the first seal ring (24) contacts with the second seal ring (14), and a closed space is defined between the vacuuming portion (10) and the pumping portion (20) so that a vacuuming pressure is equal to a pressure of the is equal to the pumping room;

wherein a height point of the top of the heating element (16) is 0.5 to 1 cm above the height point at a bottom of the heating element (16); the storage tank (15) includes a tilted guide face (298) defined on a rear portion thereof, wherein a front end of the tilted guide face (298) is lower than a rear end of the tilted guide face (298), and a top of the rear end of the tilted guide face (298) flushes with a top of the heating element (16);

wherein the pumping portion (20) includes an accommodation room (25) and a pressing portion (26) which are arranged on an interior of the pumping portion (20), the accommodation room (25), the flexible strap (23) and the pressing portion (26) are arranged in the interior of the pumping portion (20) in turn, and a bottom of the flexible strap (23) extends out of the bottom of the cap (2);

wherein after the cap (2) is locked on the holder (1), the accommodation room (25) and the storage tank (15) are defined a first storing room which is tilted and elongated, and the discharge tank (17) and the pressing portion (26) are defined a second storing room, wherein a height of an interior of a lower portion of the second storing room is greater than a height of an interior of an upper portion of the second storing room;

wherein a width of the top of the storage tank (15) obliquely along the vacuuming portion (10) is 6 to 10 cm;

wherein at least one first conduit (295) is defined among two sides of the flexible strap (23) and the first seal ring (24), and at least one second conduit (295) is defined among two sides of the heating element (16) and the second seal ring (14), after the cap (2) is locked on the holder (1), the two sides of the second storing room communicate with the two sides of the first storing room;

wherein a height difference M is defined between a top of the discharge tank (17) and the bottom of the holder (1), and the height difference M is more than 5 cm, a lowest point of the top of the discharge tank (17) is higher than a highest point of the top of the storage tank (15), and a height difference N is defined between the lowest point of the top of the discharge tank (17) and the highest point of the top of the storage tank (15), wherein the height difference N is more than 1 cm; a height to which an outer end of the opening is raised to 30 to 40% more than the total height of the household vacuum sealer; a width of the storage tank (15) is 2 to 3 times wider than a width of the discharge tank (17), a size of the first storing room is at least two times more than a size of the second storing room;

wherein the flexible strap (23) has a cavity, a cross section of which is formed in a 8 shape, and a square silicone strip engaged in the flexible strap (23), wherein the flexible strap (23) has a receiving portion defined on a top thereof, two flexible fringes formed on two inner walls of the flexible strap (23), and the pressing portion (26) formed on a bottom of the flexible strap; two tops of the two flexible fringes of the flexible strap (23) are connected with the receiving portion of the flexible strap (23), two bottoms of the two flexible fringe are connected with the pressing portion (26), and two middles of the two flexible fringes bend inward to the cavity of the flexible strap (23), wherein a thickness of a fixing portion is equal to a thickness of the two flexible fringes, a thickness of the pressing portion (26) is 2 to 3 times more than the thickness of the two flexible fringes, the pressing portion (26) has two wings extending from two sides of front and rear ends of the bottom thereof, wherein the bottom of the pressing portion (26) and two bottoms of the two wings are connected to form a plane to increase an area of the pressing portion to press the vacuum packaging bag; the cap (2) further includes a glue groove defined on the bottom thereof, and an installation portion is fixed on a bottom of the horizontal groove, wherein the two flexible fringes are received in the horizontal groove, the pressing portion (26) extends out of the bottom of the cap (2);

wherein the cap (2) includes the handle (27) rotatably connected on a top thereof and extending out of a front end of the cap (2), wherein a rear end of the handle (27) is fixed on a middle portion of a rotary shaft (28), and two sides of the rotary shaft (28) extend to the two hooks (21), wherein two rear ends of the two hooks (21) are mounted on the rotary shaft (28);

wherein the cap (2) further includes two sleeves (29) one-piece formed on two sides of a bottom thereof, and the two sleeves (29) have two fixing portions (291) one-piece formed on two inner walls thereof, wherein a height of a front end of a respective one fixing portion (291) of the two fixing portions (291) is smaller than a height of a rear end of the respective one fixing portion (291), and two arcuate corners are formed on the front end and the rear end of the respective one fixing portion (291);

wherein the two locking positions (11) are one-piece formed on the holder (1), and the two locking positions (11) have two main receiving chambers defined on two outer walls thereof to accommodate the two sleeves (29), and two auxiliary receiving chambers defined on two inner walls thereof to correspond to the two fixing portions (291) so that after the two sleeves (29) arm forced into the two locking positions (11), the two fixing portions (291) abut against the two auxiliary receiving chambers;

wherein the two sleeves (29) have two windows (292) formed on two front ends thereof, wherein a respective one sleeve (29) of the two sleeves (29) has a respective one hook (21) of the two hooks (21), wherein the handle (27) is configured to drive the rotary shaft (28) to rotate easily, and the rotary shaft (28) actuates the respective one hook (21) to rotate simultaneously, wherein the two hooks (21) have two C-shaped extensions extending outward therefrom, and two anti-slip blocks (211) separately formed on two outer walls of the two C-shaped extensions;

wherein the two main receiving chambers of the two locking positions (11) have two locking orifices (6) defined on two front ends thereof so that after the two hooks (21) rotate, the two C-shaped extensions rotatably insert into the two locking orifices (6), the two anti-slip blocks (211) of the two C-shaped extensions abut against two bottoms of the two main receiving chambers of the two locking positions (11); and wherein the two locking positions (11) have two discharge orifices (7) defined on two bottoms thereof;

wherein the discharge tank (17) includes two stop plates (8) one-piece formed on a rear wall thereof and spaced apart, and three abutting plates (9) are located on the pressing portion (26) that is on the cap (2), when the cap (2) is locked on the top of the holder (1), the two stop plates (8) are inserted among the three abutting plates (9), a lowest point of the three abutting plates (9) is higher than a front end of the storage tank (15).

2. The household vacuum sealer as claimed in claim 1, wherein the heating element (16) has an insulated seat (162) and two metal heating films (161), a width of the two metal heating films are 3 to 5 mm; the insulated seat (162) has two electrodes fixed on a bottom thereof, the two metal heating films (161) are parallelly spaced and fixed on a top of the insulated seat (162), wherein two sides of a respective one metal heating film (161) of the two metal heating films (161) are winded to the bottom of the insulated seat (162) and the two electrodes of the insulated seat (162), wherein the circuit board (2) is electrically connected with the two electrodes of the insulated seat (162) to supply a power to the two metal heating films (161), such that the two metal heating films (161) heat; wherein the respective one metal heating film (161) has an insulation cloth adhered on a top thereof.

3. The household vacuum sealer as claimed in claim 1, wherein the bag feeding portion includes a support rack (18) mounted on a top thereof, and the support rack (18) has a press bag mounting (181) and two arms (187), wherein two front ends of the two rotary arms (187) are disposed on two sides of the press bag mounting (181), and two rear ends of the two rotary arms (187) are rotatably connected on the two axial seats of the bag feeding portion, wherein a bottom of the press bag mounting (181) has a pressing plane;

wherein the press bag mounting (181) has a slidable trench (183) defined on a top thereof and passing through the press bag mounting (181) and the pressing plane, wherein two sides of the slidable trench (183) extend to the two sides of the press bag mounting (181), and the slidable trench (183) slidably accommodates slider (186), wherein the slider (186) has a push button (182) extending out of the top of the press bag mounting (181) from a top of the slider (186), a hook bag shuttle (184) extending out of the bottom of the press bag mounting (181) from the bottom of the slider (186), two cutters (185) clamped on a center of the slider (186), wherein two blades of the two cutters (185) face outward and are tiled relative to the hook bag shuttle (184);

wherein the cutter platform (13) includes a cutting trough (131) one-piece formed therein, wherein two sides of the cutting trough (131) pass through the cutter platform (13), an arcuate surface is defined on a top of the cutting trough (131) and the cutter platform (13); and wherein after the press bag mounting (181) abuts against the cutter platform (13), the hook bag shuttle (184) is received in the cutting trough (131), and the push button (182) is pushed to drive the hook bag shuttle (184) to slide horizontally.

4. The household vacuum sealer as claimed in claim 1, wherein the cap (2) further includes a receiving room (293) defined in the bottom thereof and configured to accommodate a pump element, wherein the pump element has a drawing tube and a connector connected on an end of the drawing tube, the receiving room (293) has two clampers (19) fixed on two side s thereof and configured to engage with the two sides of the drawing tube; the cap (2) further includes a socket (294) defined on the top thereof, wherein a top of the socket (294) exposes outside the top of the cap (2), and the cap (2) accommodates a control valve which is electrically connected with the circuit board (3), wherein the socket (294) is connected with the control valve, and the control valve is connected with the air pump (4).

\* \* \* \* \*